United States Patent

Ploss

[15] 3,644,017
[45] Feb. 22, 1972

[54] ELECTRO-OPTIC LIGHT MODULATOR WITH AREA SELECTION

[72] Inventor: Richard S. Ploss, Danvers, Mass.
[73] Assignee: Baird-Atomic, Inc., Cambridge, Mass.
[22] Filed: Dec. 2, 1968
[21] Appl. No.: 780,345

[52] U.S. Cl. .......................................... 350/150, 350/160
[51] Int. Cl. .................................................. G02f 1/26
[58] Field of Search ........................ 350/150, 151, 159, 160

[56] References Cited

UNITED STATES PATENTS

| 1,670,757 | 5/1928 | Von Bronk | 350/150 X |
| 2,811,898 | 11/1957 | West | 350/150 X |
| 3,429,636 | 2/1969 | Wentz | 350/160 |

*Primary Examiner*—Ronald L. Wibert
*Assistant Examiner*—J. Rothenberg
*Attorney*—Morse, Altman & Oates

[57] ABSTRACT

An electro-optic valve construction is capable of transmission throughout the entire field or at selected incremental regions. The construction is characterized by at least one stack of thin electro-optic plates, the opposite faces of which are in contiguity with interposed conducting strata. These plates are disposed in planes that are parallel to an axis of incident-collimated light in order to provide selected incremental windows under the control of selected pairs of conducting strata.

6 Claims, 5 Drawing Figures

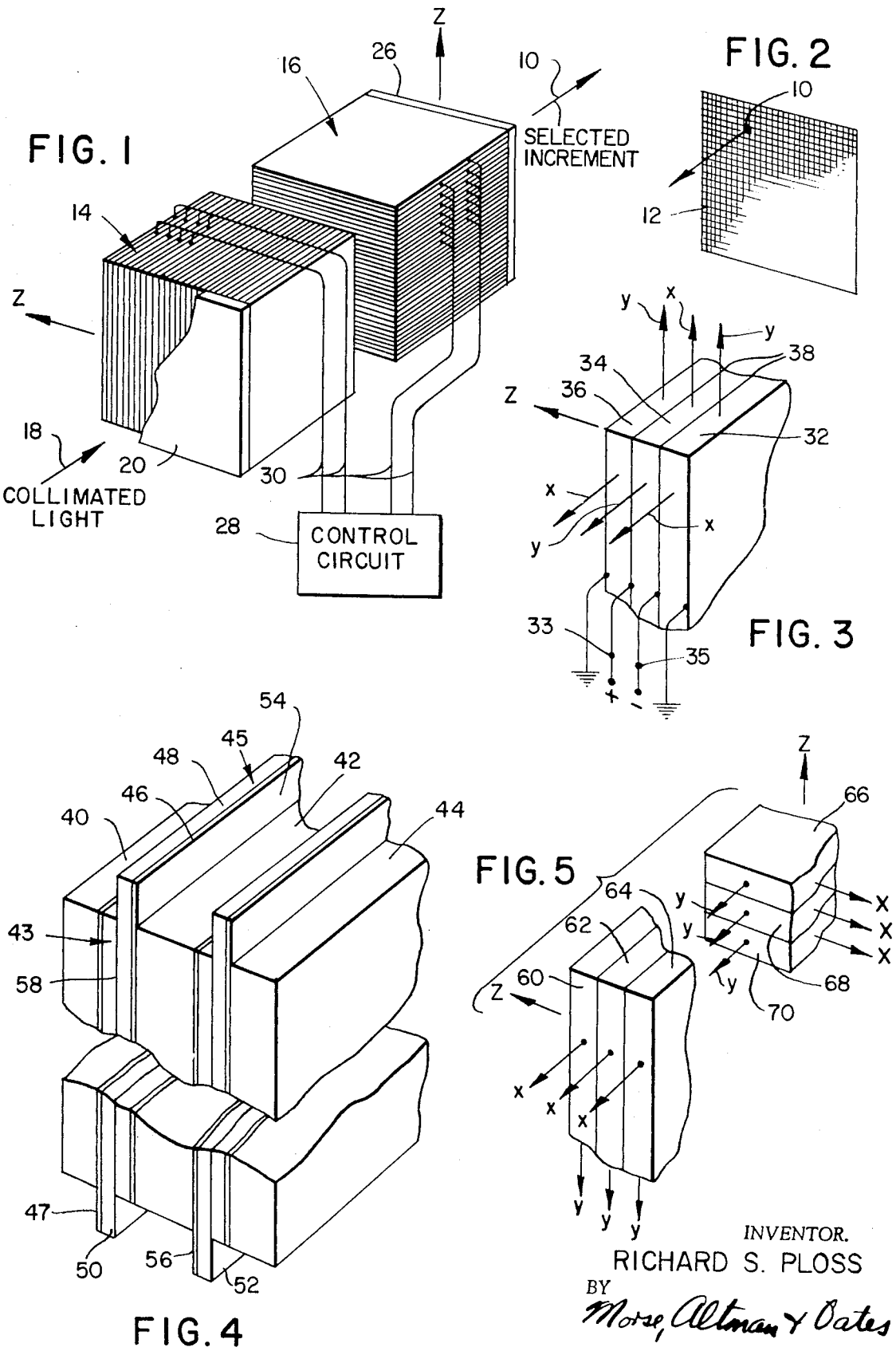

ved between the electro optical plates of stacks 14, 16 are electrically conducting coatings, the electrical potentials of which are determined by a control circuit 28, operating through suitable electrical leads 30. In operation, when deenergized, electro-optic crystals 14, 16 have no retardation effect on collimated light propagated therethrough. Accordingly, collimated light 18 becomes polarized by polarizing sheet 20 and is transmitted through stacks 14, 16 without further change of polarization form until it is blocked by polarizing sheet 26. However, when the electrically conducting coats on opposite sides of one of crystal plates 14 and one of crystal plates 16 are properly energized, the polarization form first of a line of light within stack 14 and then of a point of light within stack 16 is rotated in such a way as to be transmitted through polarizing sheet 26. Since only a vertical line of light is applied at any given time by stack 14 to stack 16, only a given point of light is transmitted through stack 16 when a single electro-optic plate in stack 14 and a single electro-optic plate in stack 16 are properly energized. Thus a single point increment 10 of light appears at the face of the electro-optic system of FIG. 1, as shown in FIG. 2.

ELECTRO-OPTIC LIGHT MODULATOR WITH AREA SELECTION

BACKGROUND AND SUMMARY

The present invention relates to electro-optic light modulators and, particularly, to light valves characterized by a crystalline medium through which light can be directed from an entrance window to an exit window, and a pair of controlled electrodes by which the transmittance of the medium with respect to the light may be varied preferably between approximately 0 percent and approximately 100 percent. It often is desired in such applications as digital information storage, graphical data presentation, pictorial image generation, etc., that a solid-state unit be switched simply in order to control the entire field or the positions of a restricted increment of light in an $x, y$ field, with low voltage.

The primary object of the present invention is to provide at least one stack of thin electro-optic plates that are disposed in perpendicularity to an $x, y$ field, that are separated by interposed conducting strata, and that are extended between a pair of crossed polarizers, by which the entire field may be switched at low voltage or incremental regions of the stack may be switched in order to transmit restricted regions of light selectively. When two such stacks are aligned in tandem with their plates crossed, and $x, y$ raster of increments is available for selection.

Other objects of the present invention are to provide specific constructions for efficiently achieving switching of the foregoing type. In one such construction, alternate crystal plates are oriented with their $z$ axes coincident and with their $x$ and $y$ axes staggered so that switching can be accomplished by alternately opposed switching voltages at the alternately opposed faces of the crystal plates. In another form, the crystal plates are arranged with their $z$ axes coincident, with their $x$ axes parallel and with their $y$ axes parallel so that switching is effected by interposed pairs of conducting strata that are electrically isolated from each other by insulation and that provide a repetitive sequence of opposed switching voltages.

Other objects of the present invention will in part be obvious and will in part appear hereinafter.

The invention accordingly comprises the devices and products, together with their elements and interrelationships, which are presented in the following disclosure, the scope of which will be indicated in the appended claims.

BRIEF DESCRIPTION OF THE DRAWINGS

For a fuller understanding of the nature and objects of the present invention, reference is made to the following detailed description, taken in connection with the accompanying drawings, wherein:

FIG. 1 is a perspective, partly broken away view of an electro-optic light modulator, constructed in accordance with the present invention;

FIG. 2 illustrates the light field presented by the device of FIG. 1;

FIG. 3, is a broken away, perspective view of details of one modification of the electro-optic light modulator of FIG. 1;

FIG. 4 illustrates details of another modification of the modulator of FIG. 1; and FIG. 5 illustrates further details of the modulator of FIG. 4.

DETAILED DESCRIPTION

FIG. 1 illustrates a system for predeterminately scanning or randomly selecting, at slow or fast speeds, one or more increments of light 10 within an $x, y$ raster of the type shown at 12 in FIG. 2. The system of FIG. 1 comprises a first stack of vertically oriented electro-optic plates 14 and a second stack of horizontally oriented plates 16, the plates of both stacks being disposed along planes that are parallel to the axis of a collimated light beam 18, which is generated by a suitable source, e.g., incandescent lamp and condenser, continuous or pulsed laser, wide area fluorescent panel, etc. At the forward face of stack 14, in perpendicular with respect to axis 18, is a polarizing sheet 20. At the rearward face of stack 16, in perpendicular with respect to axis 18, is a polarizing sheet 26. Interposed Preferred materials for the electro-optic plates of FIG. 1 are uniaxial crystals such as potassium dihydrogen phosphate, trigonal crystals such as lithium niobate and isometric crystals such as cuprous chloride. Preferably the electro-optic plates range in thickness between 0.01 and 0.20 inch and range in length between 0.5 and 1.5 inch, the contemplated voltage for one-half wave retardation along the length of the plate ranging from 10 to 500 volts. These materials exhibit Pockels effect, described in U.S. Pat. No. 2,463,109, issued Mar. 1, 1949 and U.S. Pat. No. 2,616,962, issued Nov. 4, 1962, both in the name of Hans Jaffe. The illustrated polarizing materials are of any of a variety of types, for example, dichroic polarizers characterized by two polarized beams one of which is isolated from the other by absorption, birefringent polarizers characterized by two polarized beams one of which is isolated from the other by refraction and crystal polarizers characterized by two polarized beams one of which is isolated from the other by a "pile-of-plates" interface.

FIG. 3 illustrates details of the relationships among individual crystal plates of one embodiment of the present invention. As shown these plates are oriented with their $z$ axes in coincidence. However, the parallel orientation of the sequential plates is staggered in such a way that the $y$ axes of even-numbered plates are aligned with the $x$ axes of odd-numbered plates. In other words, the $y$ axis of any center plate 34 is aligned with the $x$ axes of the neighboring plates 32, 36, between which it is sandwiched and the $x$ axis of the center plate is aligned with the $y$ axes of the neighboring plates. In the form shown, the contiguous faces of adjacent plates are bonded together with an electrically conducting cement 38, e.g., an epoxy polymer having a network of minute carbon particles dispersed therein. In one example of the construction of FIG. 6, the plates are 0.01 inch thick, 1 inch long and there are 100 plates per stack. The applied voltage 33, 35 across any plate is 50 volts for 100 percent modulation.

FIG. 4 illustrates an alternative structure in the form of a stack of electro-optic plates 40, 42, 44, etc. Cemented initially to the opposite faces of each plate are the metallized faces of a pair of opposed plastic sheets 43, 45. The metallized faces are shown at 46, 47 and the plastic strata are shown at 48, 50. It will be observed that, although the outlines of the plastic sheets generally conform to the outlines of the electro-optic plates, plastic sheets 43, 45 extend in opposite directions from between the plates in such a way as to constitute exposed electrodes for junction with the control signal. In the form shown, the arrangement is such that the outer free faces of the plastic sheets are bonded together at their interface 58 by a suitable adhesive, for example an epoxy adhesive. The arrangement is such that the direction and magnitude of any voltage applied across any plate is identical with that applied across any other plate. By virtue of the construction of FIG. 4, an arrangement of plates of the type shown in FIG. 5 is possible. This arrangement contemplates a plurality of electro-optic plates 60, 62, 64, the z axes of which coincide, the x axes of which are parallel to each other. As shown in FIG. 5, this stack is similar to a stack of plates 66, 68, 70, the plates of which are perpendicular to those shown at 60, 62, 64.

The present invention thus provides a versatile electro-optic structure capable of switching the position of a spot of light rapidly throughout a raster as well as capable of other applications. The concept is applicable to a variety of computer display systems, variety of television systems, etc. Since certain changes may be made in the foregoing disclosure without departing from the scope of the invention herein involved, it is intended that all matter contained in the foregoing description or shown in the accompanying drawings be interpreted in an illustrative and not a limiting sense.

What is claimed is:

1. An electro-optic device comprising two stacks of electro-optic plates, said plates in each of said stacks being of uniform size and disposed along parallel planes that are also parallel to an optic axis, each of said plates being composed of an electro-optic crystal medium having orthogonal $x$, $y$ and $z$ crystal axes, said $z$ axis being perpendicular to said optic axis, electrically conducting strata interposed between said electro-optic plates, the plates of one of said stacks being at right angles to the plates of the other of said stacks, a pair of crossed polarizers disposed substantially in planes perpendicular to said optic axis, one of said pair being at one end of said two stacks and the other of said pair being at the opposite end of said two stacks, and signal means for applying selected voltages across selected plates via selected electrically conducting strata.

2. The electro-optic device of claim 1 wherein said plates range in thickness from 0.01 to 0.20 inch.

3. The electro-optic device of claim 1 wherein in each stack the $z$ axes of said plates are coincident, the $x$ axes of said plates are parallel and the $y$ axes of said plates are parallel.

4. The electro-optic device of claim 1 wherein interposed between each plate are two sheets of plastic coated on opposed faces with a conductor, one of said sheets extending in one direction beyond the edge of said stack, the other of said sheets extending in another direction beyond the edge of said stack.

5. An electro-optic device comprising at least one stack of electro-optic plates, said plates being disposed along parallel planes that are also parallel to an optic axis, each of said plates being composed of an electro-optic crystal medium having orthogonal $x$, $y$ and $z$ crystal axes, said $z$ axis being perpendicular to said optical axis, in each said stack said $z$ axes of said plates being coincident and said $x$ and $y$ axes of said plates being in staggered parallelism, electrically conducting strata interposed between said electro-optic plates, a pair of crossed polarizers disposed substantially in planes perpendicular to said optic axis, one of said pair being at one end of said stack and the other of said pair being at an opposite end of said stack, and signal means for applying selected voltages across selected plates via selected electrically conducting strata.

6. An electro-optic device comprising two stacks of electro-optic plates, said plates in each of said stacks being disposed along parallel planes that are also parallel to an optic axis, each of said plates being composed of an electro-optic crystal medium having orthogonal $x$, $y$ and $z$ crystal axes, said $z$ axis being perpendicular to said optic axis, in each stack the $z$ axes of said plates are coincident and the $x$ and $x$ axes of said plates are in staggered parallelism, electrically conducting strata interposed between said electro-optic plates, the plates of one of said stacks being at right angles to the plates of the other of said stacks, a pair of crossed polarizers disposed substantially in planes perpendicular to said optic axis, one of said pair being at one end of said two stacks and the other of said pair being at the opposite end of said two stacks, and signal means for applying selected voltages across selected plates via selected electrically conducting strata.

* * * * *